United States Patent Office 3,301,751
Patented Jan. 31, 1967

3,301,751
3-(2-CYANOALLYL)RHODANINE AS A SOIL FUNGICIDE
Harry G. Durham, Hsing Yun Fan, and Mason M. Turner, Modesto, Calif., assignors to Shell Oil Company, New York, N.Y., a corporation of Delaware
No Drawing. Filed Aug. 19, 1964, Ser. No. 390,745
1 Claim. (Cl. 167—33)

This invention relates generally to fungicidal 3-(2-cyanoallyl)rhodanine. It is particularly concerned with a method for treatment of agricultural soils, inhabited by phytopathogenic soil-borne fungi, in order to protect plants against attack by these pathogens.

Many of the organisms which form part of the diverse complex that inhabit the soil subsist on living plants. Many injure the roots and other underground portions, others attack the crown of the plant, while still others are capable of damaging the stem and other above-ground portions of the plant. When plants are grown year after year in the same soil, the injury by soil pathogens is most likely to become more serious the longer the land is in cultivation, because the ready food supply leads to building of the pathogen population.

Attempts have been made to control soil fungi by suitable crop rotation, by the elimination of weeds which serve as hosts for the disease organisms, and by the propagation of resistant varieties of crops. These, and other cultural practices, have tended to reduce the damage of soil pathogens but have not fully met the present needs of intensive agriculture. The use of chemicals has met with considerable measure of success and has been confined to high value crops. The major chemicals of importance for field application to soil have been the more volatile substances which penetrate well into the soil spaces, exert their toxic action as a vapor, then volatilize from the soil prior to planting of the crop. These compounds are generally applied to the soil in high gallonage and are relatively expensive. Furthermore, there is the danger that if the chemical has not left the soil, it may be phytotoxic to the crop.

It now has been discovered that 3-(2-cyanoallyl)rhodanine is remarkably effective as a soil fungicide but is not phytotoxic at the fungicidally effective dosage. It is fungitoxic to a broad spectrum of noxious soil fungi and can be used with safety with respect to injury of the crop to be protected. Because of its low effectiveness, it will provide fungus control at much lower dosage levels than the conventional volatile materials. This should permit chemical control of soil fungi for crops for which heretofore no effectively economic control has been possible.

3-(2-cyanoallyl)rhodanine has been found effective in controlling many of the more important genera of fungi which cause rot and damping-off of plants. These include species of Pythium, Verticillium, Phytophthora, Rhizoctonia, Fusarium, and Thielaviopsis.

The following preparation and fungicidal tests are presented to illustrate the manner in which the invention may by carried out. It is to be understood that the examples are for purposes of illustration only, and that the invention is not to be regarded as limited to any of the specific conditions cited herein.

Example I.—Preparation of 3-(2-cyanoallyl)rhodanine

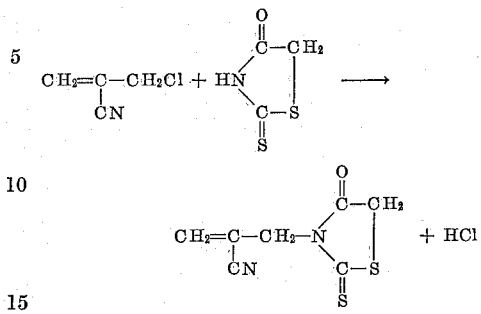

To a suspension of 93 parts of rhodanine in 200 ml. acetonitrile was added with stirring 71 parts of triethylamine. Slight exothermicity was observed. The reaction temperature rose from room temperature to 40° C. The reaction mixture was chilled to 5° C. To the above chilled reaction mixture was added 93 parts of 2-(chloromethyl)acrylonitrile in 10 minutes with stirring and cooling, while the reaction temperature was kept between 5–20° C. A voluminous precipitate was formed in the reaction mixture, which is presumably triethylamine hydrochloride. After the reaction temperature rose to 25° C., the reaction mixture was filtered to remove the salt and the filtrate was concentrated under vacuum to remove the solvent. The residue was extracted with benzene, the benzene extract was washed with 6 N hydrochloric acid, dilute sodium bicarbonate and water. The benzene extract was then concentrated under vacuum to remove benzene and the residue was triturated with 700 ml. ether to give 100 parts of purple solid, M.P. 60–62° C. The structure was confirmed both by elemental analysis and infrared spectra.

Calculated for $N_2S_2OC_7H_6$: C, 42.5; H, 3.0; S, 32.3.
Found: $N_2S_2OC_7H_6$: C, 43.1; H, 3.2; S, 32.0.

Infrared spectra showed a peak at 7.45μ indicating the presence of C=S bond.

Example II.—Effectiveness of 3-(2-cyanoallyl)rhodanine as soil fungicide 3-(2-cyanoallyl)rhodanine was evaluated by impregnating the compound on clay granules then blending the granules with soil naturally infested with root rotting organisms. The treated soil was then transferred into small plant pots. Indicator plants were next planted in the treated soil. Observations were made in three weeks on the germination and vigor of the plants. The roots were washed free of soil and indexed for disease.

The diseases and crops on which observations were made were: Rhizoctonia solani on tomato, Fusarium sp. on cotton, Thielaviopsis basicola on pinto beans, and Pythium ultimum on sugar beets. Estimates of disease control were expressed on an A–B–C–D basis, A being 75–100% disease control, and D being 0–25% control.

The results are presented in Table 1. At the dosages tested 3-(2-cyanoallyl)rhodanine was not phytotoxic to the indicator plants. 3-(2-cyanoallyl)rhodanine is an outstanding soil fungicide.

TABLE 1.—TOXICITY OF ALLYL RHODANINES TO SOIL ORGANISMS

| Compound | P.p.m. in soil | Fungitoxic rating | | | |
|---|---|---|---|---|---|
| | | Thielaviopsis | Fusarium | Rhizoctonia | Pythium |
| 3-(2-cyanoallyl)rhodanine | 1.25 | C | AB | A | A. |
| | 2.5 | A | A | A | A. |
| | 5.0 | A | A | A | A. |
| | 10.0 | A | A | A | A. |
| | 25.0 | A | A | A | A. |

For horticultural purposes, the fungicides of the present invention may be used alone or in combination with other fungicidal, viricidal, insecticidal or acaricidal materials, the action on which may be either internal or external, with plant nutritives, plant hormones, and the like. If desired, a minor amount, of the order of about 0.001 to about 1.0% by weight of a wetting agent and, if necessary or desirable, stickers such as the heavy hydrocarbon oils with a minimum viscosity of 10° Engler at 50° C. can be present. The wetting agent must be non-reactive with the fungicide of the present invention. Non-ionic surfactants seem preferable. If the fungicide is employed in the form of an emulsion or a suspension, for example, in water, solvents such as oils, emulsifiers, emulsion stabilizers, and the like may be added. Any of the conventional wetting agents can be employed. Particularly suitable wetting agents are the sodium salts of a mixture of secondary heptadecyl sulfate, sold commercially under the name of "Teepol" and polyethylene glycol ethers of alkyl phenols sold under the tradenames of "Trition X-100" and "Triton X-155." Preferably concentrated compositions comprising the fungicide of the present invention and a suitable wetting agent are prepared, and the concentrate is then dispersed in water prior to use.

A further form in which the fungicide of the present invention may be applied for horticultural use consists of solutions of the fungicide in suitable inert liquid or semi-solid diluents in which the fungicide is present in molecularly dispersed form. The form in which the fungicide is applied to the objects treated depends on the nature of the object and the purpose of the application. Suitable inert solvents for the manufacture of liquid preparations should not be readily flammable, as odorless as possible and without any toxic effect on humans and animals when properly used. Neither should they have a corrosive effect on the components of the preparations or the material of the storage vessel. Examples of suitable solvents are high-boiling oils, e.g., oils of vegetable origin, such as castor oil, etc., and lower boiling solvents with a flash point of at least 30° C., such as carbon tetrachloride, ethylene dichloride, acetylene tetrachloride, hydrogenated naphthalene, alkylated naphthalene, sorbent naphtha, etc. Mixtures of solvents may also be used. Non-aromatic petroleum oils and xylene are commonly employed.

For horticultural use the fungicide of the present invention may also be applied in the form of a dust, utilizing as the inert vehicle such materials as tricalcium phosphate, precipitated chalk, bentonite, kaolin, kieselguhr, etc. The fungicide may also be employed in the form of an aerosol. For this purpose the fungicide is dissolved or dispersed in a solvent boiling below room temperature at atmospheric pressure.

Fungicidal compositions according to this invention may contain as much as 95 percent or as little as 0.1 percent by weight of the 3-(2-chloroallyl)rhodanine.

For field application, the rate of application of the fungicide may be varied from about 0.1 to 30 or more pounds per acre. It will be appreciated that the rate of application is subject to variation according to the particular species or complex of organisms to be controlled, the species of plants to be protected, and local conditions, for example, temperature, humidity, moisture content of the soil, nature of the soil and the like. Effective resolution of these factors is well within the skill of those well versed in the pesticide art.

The fungicidal compositions may contain 3-(2-cyanoallyl)rhodanine as the sole active agent, or they may contain in addition thereto other biologically active substances. Thus, for example other fungicides known to the art may be used in conjunction with the compounds of the invention. Insecticides such as, for example, DDT, aldrin, dieldrin, endrin, chlordane, methoxychlor, DDVP, naled, Phosdrin® insecticide, Bidrin® insecticide, and the like may be incorporated into marketable formulations. Further, if desired, the fungicidal compositions may contain nematocides, fertilizers, trace elements, and the like.

We claim as our invention:

A method of controlling soil fungi which comprises applying to the soil an effective fungicidal quantity of 3-(2-cyanoallyl)rhodanine.

References Cited by the Examiner

FOREIGN PATENTS 909,629  5/1946  France.

OTHER REFERENCES

Brown et al., Industrial and Engineering Chemistry, vol. 46, No. 7, pp. 1508–1512, July 1954.

JULIAN S. LEVITT, *Primary Examiner.*

JEROME D. GOLDBERG, *Assistant Examiner.*